United States Patent
Wette

(10) Patent No.: US 6,902,486 B2
(45) Date of Patent: Jun. 7, 2005

(54) TRIPOD JOINT ASSEMBLY

(75) Inventor: Joachim Wette, Hennef (DE)

(73) Assignee: GKN Automotive GmbH (DE)

( * ) Notice: Subject to any disclaimer, the term of this patent is extended or adjusted under 35 U.S.C. 154(b) by 15 days.

(21) Appl. No.: 10/321,976

(22) Filed: Dec. 17, 2002

(65) Prior Publication Data

US 2003/0134076 A1 Jul. 17, 2003

(30) Foreign Application Priority Data

Dec. 17, 2001 (DE) .......................................... 101 61 987

(51) Int. Cl.$^7$ ................................................ F16D 3/84
(52) U.S. Cl. ...................... 464/111; 464/123; 464/124; 464/175; 464/905; 428/36.9
(58) Field of Search ................................. 428/36.9, 212, 428/217; 464/175, 111, 102, 123, 124, 905; 277/636

(56) References Cited

U.S. PATENT DOCUMENTS

| 4,280,340 A | 7/1981 | Goguet |
|---|---|---|
| 4,795,404 A | 1/1989 | Sutton et al. |
| 4,927,678 A | 5/1990 | Lallement |
| 6,471,595 B1 | 10/2002 | Neviani |

*Primary Examiner*—Alexander S. Thomas

(57) ABSTRACT

The invention relates to a tripod joint assembly, suited for the driveline of motor vehicles. It includes an outer joint part, rollers and an inner joint part which is connected to a shaft in a rotationally fast way, with an annular gap being formed between the shaft and the outer joint part, as well as a convoluted boot for sealing the annular gap. The outer joint part comprises a wall whose outer contour, in cross-section, deviates from the circular shape and which comprises a radially outwardly directed, circumferentially extending bead. The convoluted boot comprises an adapter ring and a convoluted portion connected to the adapter ring, with the adapter ring, on its radial inside, comprising an annular circumferential recess and, in its cross-section, being suitable for being fitted on to the outer joint part. When the adapter ring is fitted on to the outer joint part, the bead of the outer joint part engages the circumferential recess of the adapter ring in order to provide axial security.

7 Claims, 1 Drawing Sheet

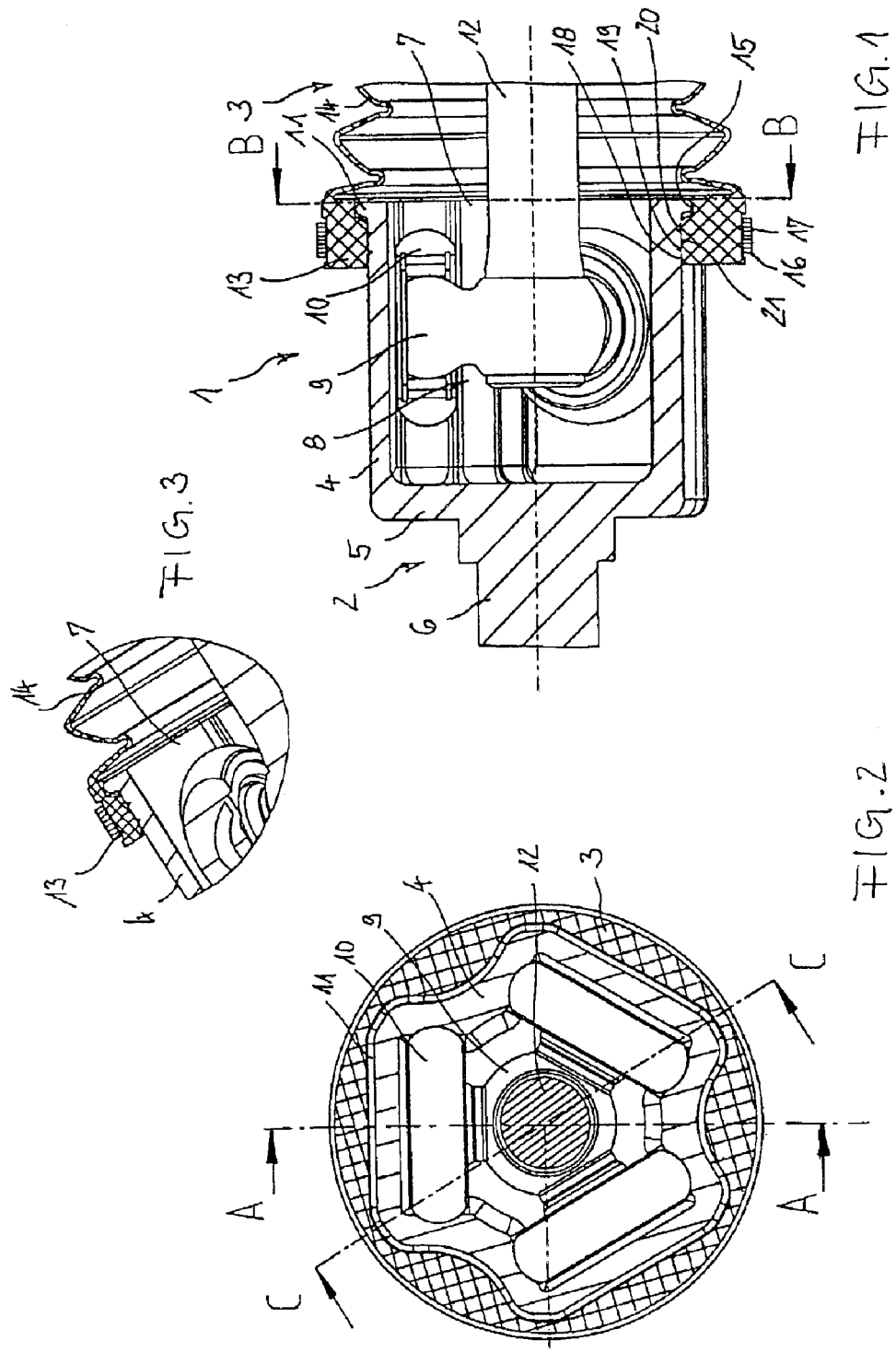

TRIPOD JOINT ASSEMBLY

TECHNICAL FIELD

The invention relates to a tripod joint assembly, particularly suited for the driveline of a motor vehicle. It comprises an outer joint part, rollers and a tripod star. The outer joint part, for torque transmitting purposes, is connectable to a shaft adjoining the outer joint part. The tripod joint assembly also comprises a convoluted boot for sealing the annular gap between the outer joint part and the shaft.

BACKGROUND OF THE INVENTION

From U.S. Pat. No. 4,927,678 there is known such a tripod joint assembly. On its radial outside, the outer joint part comprises a cylindrical annular seat and two annular beads extending in parallel thereto. The convoluted boot is designed to be rotationally symmetrical and, at the joint end, comprises a cylindrical collar as well as a convoluted portion adjoining same. When the convoluted boot is in a condition where it is slipped on to the outer joint part, the cylindrical collar of the convoluted boot is arranged on the necessarily cylindrical annular seat between the two annular beads, with the annular bead at the boot end engaging a first fold of the convoluted portion.

At their aperture end, solid-formed outer joint parts of tripod joints may comprise a clover-leaf-like cross-section at their outer circumference, i.e. they each comprise three circumferentially distributed raised portions and indented portions copying the tripod arms and rollers of the inner joint part, and thus do not allow rotationally symmetric convoluted boots to be slipped on directly.

From U.S. Pat. No. 4,795,404 it is known, to provide an intermediate element or cover on the open end of the outer joint part of a tripod joint, that is internally adapted to the clover-leaf-like cross-section of the outer joint part and externally adapted to the circular cross section of the end sleeve of the convoluted boot. This intermediate element has to be fixed to, and sealed against, the outer joint part which may cause difficulties. Further, the end sleeve of the convoluted boot has to be fixed to, and sealed against, the intermediate element.

In U.S. Pat. No. 6,471,595 there is disclosed a convoluted boot for tripod joints having a sleeve at the outer joint part end that is cylindrical on the outside to receive a clamp band, and adapted in cross section of the outer joint part on the inside, to provide a sealing connection to the outer joint part. For axial securing purposes, the outer joint part has a discontinuous groove being produced by a turning process and the convoluted boot has discontinuous inner projections engaging the groove. The boot is made as an integral product from a homogeneous material.

SUMMARY OF THE INVENTION

It is therefore an object of the present invention to provide a tripod joint assembly, particularly suited for the driveline of a motor vehicle, which, for outer joint parts wherein the cross-section of their outer contour deviates from a circular shape, ensures a secure axial connection between the convoluted boot and the outer joint part while at the same time providing improved sealing properties and achieving a reduction in production costs.

In accordance with an embodiment of the invention, a tripod joint assembly is provided which is particularly suited for the drive-line of a motor vehicle. The assembly comprises an outer joint part, rollers and a tripod star, for being connected to a shaft in a rotationally fast way, with an annular gap being formed between the shaft and the outer joint part. The outer contour of the outer joint part is clover-leaf-like in a cross-sectional view and comprises at least one radially outwardly directed, circumferentially extending bead. A convoluted boot is also provided with an adapter ring and a convoluted portion connected thereto, as well as a collar region, for sealing the annular gap between the outer joint part and the shaft. In a cross-sectional view, the adapter ring is form-fittingly adapted to the outer joint part and, on its radial inside, comprises at least one circumferential recess. To provide axial security, the at least one bead of the outer joint part engages the at least one circumferential recess of the adapter ring.

The advantage of this embodiment is that the at least one bead of the outer joint part which engages the at least one circumferential recess of the adapter ring ensure a secure connection between the outer joint part and the convoluted boot. In this way, the sealing function between the adapter ring and the outer joint part can be separated from the axial securing function. If the convoluted boot is subjected to tensile loads away from the tripod joint, such as occur with an extended or articulated tripod joint, there is no risk of any leakages because the shoulder formed by the at least one circumferential recess comes to rest against the at least one bead. As a result, an axial displacement is prevented. The at least one bead engages the at least one circumferential recess—preferably with a small amount of play or in an axially play-free way. Towards the end of the convoluted portion, the circumferential recess can be provided in the form of an open broken-out edge. However, the at least one circumferential recess can also cooperate with the at least one bead in a positive, form-fitting way in both axial directions.

The beads and circumferential recesses can form individual circumferential portions corresponding to one another or they can be provided in the form of an individual continuous bead and a continuous circumferential recess.

According to one embodiment, between the at least one bead and the at least one circumferential recess, there is formed a radial gap which serves to offset radial tolerances in order to ensure that, at all times, a sealing face of the adapter ring is in contact with the outer joint part. Accordingly, in a further aspect of the invention the adapter ring, at its inner face, comprises at least one continuous sealing lip to provide sealing contact with the outer joint part.

According to another embodiment, the outside of the adapter ring is cylindrical. On its radial outside, it comprises a continuous annular groove for receiving a clamp band. The annular groove is preferably axially offset relative to the at least one inner circumferential recess. The cylindrical outer face of the annular groove ensures that the force generated by the clamp band acts uniformly on the outer face of the outer joint part. In this way, the sealing face is uniformly loaded against the outer joint part, so that the gap between the adapter ring and the outer joint part is sealed securely. In one embodiment, the adapter ring, on its inner face, comprises at least one continuous sealing lip which extends parallel to the at least one circumferential recess and which provides sealing contact with the outer joint part. By providing an annular groove which is axially offset relative to the at least one circumferential recess it is ensured that the pressure applied by the adapter ring to the outer joint part, which pressure is required for sealing purposes, is mostly generated in the region of the sealing face. The axial securing function in the form of the engagement between the bead and the circumferential recess remains unaffected hereby.

According to a further embodiment, the convoluted boot assembly is provided in one piece. According to an alternative embodiment, the convoluted boot assembly is produced in two parts, with the adapter ring and the convoluted portion, while abutting one another, being glued or thermally welded to one another, or with the latter being slid on to the former. This embodiment is advantageous in that the adapter ring and the convoluted portion can be produced from different materials, whereas the convoluted portion is normally blow-formed and consists of a thermoplastic material. The adapter ring is preferably injection-molded. However, other production methods and materials are also contemplated by the presented invention. Prior to the assembly of the joint, both components can be connected to one another in a form-fitting or material-locking way. When inserting the inner joint part into the outer joint part, only the adapter ring which has already been firmly connected to the convoluted portion needs to be slipped on to the outer joint part.

In a still further embodiment, the at least one bead of the outer joint part is produced by solid-forming, such as during a forging operation or during a subsequent calibrating operation, with the at least one bead being positioned directly at the aperture end of the outer joint part. Because the adapter ring is axially secured to the outer joint part in a form-fitting way by the at least one bead engaging the at least one circumferential recess, there is no need for a circular circumferential groove in the outer face of the outer joint part in order to fix the convoluted boot. An additional production operation in the form of a chip-forming operation can thus be eliminated, as a result of which the production costs of the outer joint part are reduced.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiment illustrated in greater detail in the accompanying drawings and described below by way of examples of the invention.

In the drawings:

FIG. 1 is half a longitudinal section through a tripod joint assembly taken along sectional line A—A of FIG. 2.

FIG. 2 is a tripod joint assembly according to FIG. 1 in a cross-section according to sectional line B—B of FIG. 1.

FIG. 3 shows a tripod joint assembly according to FIG. 1 in part of a cross-section along sectional line C—C of FIG. 2.

DETAILED DESCRIPTION OF THE INVENTION

FIGS. 1 to 3 will be described jointly below. They show an inventive tripod joint assembly having a tripod joint 2 with a convoluted boot assembly 3. The tripod joint 2 comprises an outer joint part 4 which, in a cross-sectional view, has a clover-leaf-like outer and inner contour. At one end, the outer joint part 4 is closed by a base 5 to which there is attached a journal 6 for torque transmitting purposes. At the opposite axial end of the base 5 there is provided an aperture 7. In the region adjoining the aperture 7, the wall of the outer joint part 4 comprises a radially outwardly directed continuous bead 11 which can be produced during a process of forging or cold-forming the outer joint part 4. There is no need for the bead 11 to subsequently undergo chip-forming machining. The outer joint part 4 is engaged by an inner joint part 8 which comprises a tripod star 9 and roller assemblies 10. A shaft 12 is inserted into the tripod star 9 in a rotationally fast way. The assembly consisting of the inner joint part 8 and the shaft 12 is held in the outer joint part 4 so as to be axially displaceable and angularly movable.

The convoluted boot 3 comprises an adapter ring 13 and a convoluted portion 14. The convoluted portion 14 bridges the joint space between the outer joint part 4 and the shaft 12. At its end which faces away from the tripod joint 2 and is not described in greater detail, the convoluted portion 14 comprises a collar which is sealingly secured on the shaft 12. The adapter ring 13 has an inner contour which corresponds to the clover-leaf-like outer contour of the outer joint part 4. On its radial inside, the adapter ring 13 comprises a sealing face 18 with two continuous sealing lips 19, 20 which are axially offset relative to one another and which serve to seal the gap between the outer joint part 4 and the convoluted boot 3. In the axial direction, the sealing face 18 is delimited by a continuous circumferential recess 15 which is open towards the convoluted portion end. The adapter ring 13 is cylindrical on its radial outside and comprises a continuous annular groove 16.

For the purpose of fitting the convoluted boot 3 on the outer joint part 4, the adapter ring 13, by way of its sealing face 18, is slid over the bead 11 until it engages the circumferential recess 15. In this way, the adapter ring 13 and the outer joint part 4 are firmly connected to one another in the axial direction. By way of a tensioning strip or clamp band 17, the adapter ring 13 with its cylindrical outside is loaded radially inwardly, as a result of which the gap between the sealing face 18 and an annular seat 21 on the outer joint part is sealed. In the fitted condition, the sealing lips 19, 20 of the adapter ring 13 are pressed on to the annular seat 21 of the outer joint part 4 in such a way that local gaps are sealingly bridged.

An advantageous feature of the inventive assembly is that the sealing region and the region provided for axial fixing purposes are separate from one another. This does not mean, however, that the region provided for axial fixing purposes cannot be located within a wider sealing region. Even when the tripod joint is in an articulated condition, the form-fitting axial connection is very secure. If the convoluted boot 3 is subjected to a tensile load away from the tripod joint 2, there is no risk of leakages because the shoulder formed by the circumferential recess 15 rests against the bead 11, as a result of which any axial displacement is prevented. The clamp band 17 prevents the adapter ring 13 from axially sliding with its sealing face 18 over the annular bead 11.

The adapter ring 13 and the folded or convoluted portion 14 can be produced from different materials and connected to one another. This makes it possible to produce a convoluted portion 14 with a substantially entirely rotationally symmetric shape blow-formed from a piece of hose from a first material, such as rubber, and to produce the adapter ring 13 whose radial inner contour corresponds to the clover-leaf-like outer contour of the outer joint part 4 from a different material such as thermoplastic plastics by injection molding.

From the foregoing, it can be seen that there has been brought to the art a new and improved tripod joint assembly. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A tripod joint assembly comprising:

an outer joint part, rollers and a tripod star, for being connected to a shaft in a rotationally last way, with an annular gap being formed between the shaft and the outer joint part, the outer joint part having, in a cross-sectional view, a clover-leaf-like outer contour and comprising at least one radially outwardly directed, circumferentially extending bead; and a convoluted boot with an adapter ring and a convoluted portion connected thereto, as well as a collar region, for sealing the annular gap between the outer joint part and the shaft, the adapter ring, in a cross-sectional view, being form-fittingly adapted to the outer joint part and, on its radial inside, comprising at least one circumferential recess, wherein, to provide axial security, the at least one bead of the outer joint part engages the at least one circumferential recess of the adapter ring, wherein, in the adapter ring, the at least one circumferential recess is open towards the convoluted portion of the convoluted boot.

2. A tripod joint assembly according to claim 1, wherein, on its outside, the adapter ring is cylindrical.

3. A tripod joint assembly according to claim 2, wherein, on its outside, the adapter ring comprises a continuous annular groove for receiving a clamp band.

4. A tripod joint assembly according to claim 3, wherein the annular groove is arranged so as to be axially offset relative to the at least one circumferential recess.

5. A tripod joint assembly according to claim 1, wherein, on its inner face, the adapter ring comprises at least one continuous sealing lip which extends parallel to the circumferential recess for ensuring sealing contact with the outer joint part.

6. A tripod joint assembly comprising:

an outer joint part, rollers and a tripod star, for being connected to a shaft in a rotationally fast way, with an annular gap being formed between the shaft and the outer joint part, the outer joint part having, in a cross-sectional view, a clover-leaf-like outer contour and comprising at least one radially outwardly directed, circumferentially extending bead; and a convoluted boot with an adapter ring and a convoluted portion connected thereto, as well as a collar region, for sealing the annular gap between the outer joint part and the shaft, the adapter ring, in a cross-sectional view, being form-fittingly adapted to the outer joint part and, on its radial inside, comprising at least one circumferential recess, wherein, to provide axial security, the at least one bead of the outer joint part engages the at least one circumferential recess of the adapter ring, wherein the adapter ring and the convoluted portion are produced in two parts and fixed to one another, wherein the adapter ring and the convoluted portion are produced from different materials.

7. A tripod joint assembly comprising:

an outer joint part, rollers and a tripod star, for being connected to a shaft in a rotationally fast way, with an annular gap being formed between the shaft and the outer joint part, the outer joint part having, in a cross-sectional view, a clover-leaf-like outer contour and comprising at least one radially outwardly directed, circumferentially extending bead; and a convoluted boot with an adapter ring and a convoluted portion connected thereto, as well as a collar region, for sealing the annular gap between the outer joint part and the shaft, the adapter ring, in a cross-sectional view, being form-fittingly adapted to the outer joint part and, on its radial inside, comprising at least one circumferential recess, wherein, to provide axial security, the at least one bead of the outer joint part engages the at least one circumferential recess of the adapter ring, on its inner face, the adapter ring comprises at least one continuous searing lip which extends parallel to the circumferential recess for ensuring sealing contact with the outer joint part, and wherein, on its outside, the adapter ring is cylindrical and comprises a continuous annular groove for receiving a clamp band, the annular groove being arranged so as to be axially offset relative to the at least one circumferential recess, wherein the adapter ring and the convoluted portion are produced from different materials.

* * * * *